United States Patent
Ventelon et al.

(10) Patent No.: US 8,967,815 B2
(45) Date of Patent: Mar. 3, 2015

(54) MIRROR WITH INCREASED REFLECTANCE

(75) Inventors: Lionel Ventelon, Jumet (BE); Bruno Cosijns, Jumet (BE); Pierre Boulager, Jumet (BE); Joseph Leclercq, Philippeville (BE)

(73) Assignee: AGC Glass Europe, Brussels (BE)

( * ) Notice: Subject to any disclaimer, the term of this patent is extended or adjusted under 35 U.S.C. 154(b) by 159 days.

(21) Appl. No.: 13/121,869

(22) PCT Filed: Oct. 5, 2009

(86) PCT No.: PCT/EP2009/062879
§ 371 (c)(1),
(2), (4) Date: Jun. 14, 2011

(87) PCT Pub. No.: WO2010/037867
PCT Pub. Date: Apr. 8, 2010

(65) Prior Publication Data
US 2011/0235203 A1    Sep. 29, 2011

(30) Foreign Application Priority Data

Oct. 3, 2008  (BE) .................................. 2008/0550
Oct. 3, 2008  (EP) .................................. 08165838

(51) Int. Cl.
| | | |
|---|---|---|
| G02B 5/04 | (2006.01) | |
| G02B 5/08 | (2006.01) | |
| C22C 32/00 | (2006.01) | |
| C03C 17/38 | (2006.01) | |
| C03C 17/36 | (2006.01) | |
| C23C 18/16 | (2006.01) | |
| C23C 18/18 | (2006.01) | |

(52) U.S. Cl.
CPC ............. *C03C 17/38* (2013.01); *C03C 17/3663* (2013.01); *C23C 18/165* (2013.01); *C23C 18/166* (2013.01); *C23C 18/1689* (2013.01); *C23C 18/1889* (2013.01); *G02B 5/0808* (2013.01); *C03C 2218/31* (2013.01); *C03C 2218/32* (2013.01)
USPC .............. 359/838; 359/883; 359/884; 419/21

(58) Field of Classification Search
None
See application file for complete search history.

(56) References Cited

U.S. PATENT DOCUMENTS

| | | | | |
|---|---|---|---|---|
| 4,780,372 A | * | 10/1988 | Tracy et al. .................. | 428/428 |
| 2009/0153988 A1 | | 6/2009 | Ventelon et al. | |
| 2009/0220689 A1 | | 9/2009 | Bahls | |

FOREIGN PATENT DOCUMENTS

| | | |
|---|---|---|
| FR | 2 719 839 | 11/1995 |
| WO | 2006 121516 | 11/2006 |
| WO | WO 2007144311 A1 * | 12/2007 |

OTHER PUBLICATIONS

"Silver nitride" https://en.wikipedia.org/wiki/Silver_nitride, Apr. 9, 2014.*
Vijayakumar, K. P. et al., "Effect of Annealing on the Reflectivity of Silver Films", Thin Solid Films, vol. 82, No. 3, pp. 225-227, XP-0025730877, (Aug. 21, 1981).
Guenther, K. H., "Physical and Chemical Aspects in the Application of Thin Films on Optical Elements", Applied Optics, vol. 23, No. 20, pp. 3612-3632, XP-002528201, (Oct. 15, 1984).
Sharma, S. K. et al., "Agglomeration in Chemically Deposited Silver Films", Thin Solid Films, vol. 66, No. 3, pp. L51-L53, XP-025719698, (Mar. 17, 1980).
Sharma, S. K. et al., "Hillock Formation, Hole Growth and Agglomeration in Thin Silver Films", Thin Solid Films, vol. 65, No. 3, pp. 339-350, XP-025698631, (Feb. 1, 1980).
International Search Report Issued Dec. 29, 2009 in PCT/EP09/062879 filed Oct. 5, 2009.
U.S. Appl. No. 13/058,116, filed Feb. 8, 2011, Ventelon, et al.
U.S. Appl. No. 13/997,765, filed Jun. 17, 2013, Ventelon, et al.

* cited by examiner

*Primary Examiner* — Jade R Chwasz
(74) *Attorney, Agent, or Firm* — Oblon, McClelland, Maier & Neustadt, L.L.P.

(57) ABSTRACT

A process for manufacturing mirrors with increased reflectance includes forming a silver layer on a surface of a glass substrate, during which the surface is contacted with a silvering solution, and painting at least one paint layer to cover the silver layer. Between forming the silver layer and the painting, the process includes reheating the silver layer to a temperature of at least 200° C.

27 Claims, No Drawings

MIRROR WITH INCREASED REFLECTANCE

This invention relates to mirrors and to processes for manufacturing such mirrors.

The mirrors of this invention can have various applications, for example: domestic mirrors used, amongst others, in furniture, wardrobes or bathrooms; mirrors for make-up boxes or powder compacts; mirrors used in the automotive industry such as rear-view mirrors for vehicles, for example. However, this invention can be particularly advantageous in mirrors used as solar energy reflectors.

The mirrors according to this invention can be used as reflectors in solar power plants. Such installations use solar energy to first generate heat, which can then be converted into electricity or be used for steam production. Solar power plants in which mirrors according to the present invention can be used include, for example, parabolic trough power plants, dish-type power plants, tower power plants and parabolic collector plants. Mirrors according to the present invention can be used as flat or curved reflectors.

Domestic mirrors and mirrors for solar applications have generally been produced as follows: a sheet of flat glass (float, soda-lime glass) is firstly polished and rinsed, then sensitised using a solution of tin chloride; after rinsing, the surface of the glass is traditionally activated using an ammoniacal silver nitrate treatment and then a silvering solution is applied to form a silver layer; this silver layer is then covered with a protective layer of copper. After drying at around 50-60° C. for about 1 minute (temperature measured at the silver layer or on the glass itself), one or more coats of leaded paint are applied to produce the finished mirror. The combination of the protective copper layer and the leaded paint was generally deemed necessary to give the mirror acceptable ageing characteristics and sufficient corrosion resistance.

More recently, mirrors have been developed that no longer required the conventional protective copper layer, which could use substantially lead-free paints and yet still exhibited acceptable or even improved ageing characteristics and corrosion resistance. For example, French patent FR 2719839 describes embodiments of mirrors with no copper layer comprising the following steps: treating the surface of the glass with tin chloride (sensitisation) and palladium chloride (activation); rinsing; formation of the silver layer; rinsing; treating the silvered surface with tin chloride (passivation); rinsing and drying; applying at least one paint layer. The step of drying the silver that occurs before the painting step is traditionally conducted in a furnace at a temperature of around 50-60° C. (temperature measured at the silver layer or on the glass itself) for about 1 minute. This new generation of mirrors marks a significant advance compared to conventional coppered mirrors.

A highly important property for a mirror for solar application is its ability to reflect the rays of the sun that is decisive for the output of the solar power plant in which it is installed. During operation, the rays of the sun pass through the glass substrate of the mirror a first time, are reflected at the silver layer, then pass through the glass substrate a second time. To increase the reflective properties of solar mirrors, it is known to use finer glass sheets as substrate for the mirrors or to use extra-clear glass, i.e. a glass with a total iron content, expressed as $Fe_2O_3$, of less than 0.02% by wt., thus reducing the absorbent effect of the glass with respect to solar radiation. It is also known to increase the quantity of silver present in the reflective silver layer: a quantity of silver in the vicinity of 1200-1500 mg/m$^2$ can prove to be a good compromise between favourable reflection values and acceptable production cost. Nevertheless, the solar mirror industry is still seeking increased performances in terms of light and energy reflection.

According to one of its aspects, the present invention relates to a process for producing a mirror according to claim 1 with dependent claims presenting preferred embodiments.

The invention relates to a process for manufacturing a mirror comprising the following steps:

a step for forming a silver layer on a surface of a glass substrate, during which said surface is brought into contact with a silvering solution, a painting step, during which the silver layer is covered by at least one paint layer, and between the step for forming the silver layer and the painting step, a step for reheating the silver layer to a temperature of at least 200° C.

Unless stated otherwise, the reheating temperatures of the silver layer mentioned above are temperatures measured at the silver layer, i.e. the temperatures that the silver layer will reach. The measurement can be taken using sensors placed on the surface of the silver layer. In the majority of cases, this temperature is equivalent to the temperature of the glass substrate and the sensors can be placed on the surface of the glass in contact with the silver layer or that opposed to the silver layer. In the case where metal induction is used to heat the silver layer, the temperature that the silver layer reaches during reheating is not, however, equivalent to that of the glass, since metal induction does not directly cause heating in the glass. In the case of microwave or microwave-assisted heating, a temperature difference between the silver layer and the glass may possibly be observed. Alternatively, the temperatures reached can be measured by thermal camera.

The process according to the invention has the advantage of enabling mirrors to be produced that have a higher light and/or energy reflection than that of a mirror of identical manufacture (including the same composition and thickness of the glass substrate, same quantity of silver on the glass), only comprises a single step of drying the silver layer (typically at around 50-60° C. for about 1 minute) and no reheating step at a temperature of at least 200° C. Moreover, this improvement of the reflection properties of the mirror is not to the detriment of other important properties, e.g. resistance of the mirror to corrosion and/or ageing.

Without wishing to be bound by theory, we consider that a modification within the silver layer occurs when this layer is subjected to a certain amount of heat, wherein this modification causes an increase in the light and energy reflection of mirrors that include such a layer. We have discovered that the traditional step of drying the silver does not provide a sufficient amount of heat for the modification of the silver to take place. During the deposition of the coat or coats of paint onto the silvered face of the glass substrate, the silver layer is subjected to temperatures typically in the order of 100 to 180° C., thus enabling the paint layers to dry. We have discovered that these paint drying steps brought a certain amount of heat to the silver layer to allow initiation of the modification causing an increase in reflection, but above all we have discovered that this amount of heat was not sufficient to optimise the increase in reflection and that the reflection values could still be increased by supplying an additional amount of heat to the silver layer prior to the application of paint. We then discovered that it was not sufficient to extend the duration of the traditional steps of drying the silver layer and/or drying coats of paint to optimise the increase in reflection, but that it was necessary to cross a temperature threshold within the silver layer. We have found that this threshold was located at a higher temperature than the temperatures currently used in drying steps of typical paints for mirrors.

The reheating step for the silver layer preferably occurs at a temperature higher than 200° C. or higher than or equal to 225° C., 250° C., 275° C., 300° C., 325° C., 350° C., 375° C. or 400° C. The reheating temperature preferably does not exceed 700° C., 650° C., 600° C., 575° C. or 550° C. Temperatures that are too high can damage the silver layer (e.g. appearance of holes causing a decrease in reflectivity) and the glass substrate cannot exceed a temperature of 600° C. at the risk of becoming viscous. The duration of the reheating step depends on the reheating temperature. In general, at equivalent temperature the reflections increase with the reheating period, and the reheating period necessary to reach identical reflection values decreases as the reheating temperature increases. The duration of the reheating step can preferably be more than or equal to 1, 2, 3 or 5 minutes; it can be less than or equal to 20, 15, 10, 8 or 5 minutes. Without wishing to be bound by theory, we have found that there is a threshold beyond which the light and energy reflection values no longer increase, i.e. a threshold beyond which an additional supply of an amount of heat to the silver layer no longer causes an increase in reflection.

In certain embodiments of the invention, the silver layer can be dried in the known manner (~50-60° C.~1 min) before the reheating step according to the invention.

The step of reheating the silver layer can be conducted using any known heating method, e.g. by using an infrared radiation furnace or a convection oven, such furnaces being able to operate in an atmosphere of air or an inert atmosphere, e.g. argon or nitrogen, and can be tunnel or autoclave furnaces, for example, or by metal induction, or again by microwaves. The different methods of heating can also be used in combination. Reheating in an inert atmosphere can slow down or prevent the formation of holes in the silver layer that result in an increase in transmittance and a decrease in reflectivity of the mirrors.

A method of heating by induction is proposed, for example, in the patent application EP 08165838, the priority of which is claimed here and which is incorporated herein by reference.

The invention described in patent application EP 08165838 relates to a continuous process of selective heating of at least one electrically conductive thin layer (for example, a thin silver layer of few tens of nm) covering a surface of a non-conductive substrate (for example, a glass substrate) by Foucault current induction in the entire volume of the layer comprising the continuous passage of the substrate covered by the layer through an electromagnetic inductor device supplied by a high-frequency alternating electric current, wherein the Foucault currents induced in the layer are generated by two magnetic fields, the first having longitudinal field lines parallel to the direction of passage of the substrate-conductive layer unit and the second having transverse lines radiating radially around elongated sections of the inductor. The invention is characterised by the fact that the transverse field is formed so that planes traced perpendicularly to the surface of the layer and passing through the elongated sections of the inductor located respectively above and below the substrate-layer unit do not merge, but are distinct and parallel. According to this invention, the inductor is also preferably formed from a small number of metal windings, through which a high-frequency electric current is run and through which the covered substrate passes continuously. The windings are preferably each arranged in parallel planes and the separate planes are obtained by inclining the planes defined by each winding relative to the direction of the passage of the substrate-layer unit by an acute angle α selected from the range of 5° to 50°.

The following parameters are preferably used for the induction heating of mirrors having a silver layer with a thickness in the range of e.g. between 65 and 155 nm:
a frequency of at least 800 kHz or 1000 kHz, preferably at least 1100 kHz or 1200 kHz; a frequency of 2000 kHz or 1700 kHz at maximum, preferably 1600 kHz or 1500 kHz at maximum;
an energy density of 3 W/cm$^2$ or 2.5 W/cm$^2$ at maximum, preferably 2 W/cm$^2$ at maximum; an energy density of around 1.5 W/cm$^2$.

Advantageously, the silver layer is formed on a flat float, preferably extra-clear, glass i.e. a glass with a total iron content, expressed as $Fe_2O_3$, of less than 0.02% by wt. The extra-clear glass benefits favourable reflection values.

The quantity of silver deposited onto the glass is preferably higher than or equal to 800 mg/m$^2$, 1000 mg/m$^2$, 1200 mg/m$^2$ or 1400 mg/m$^2$; it is preferably lower than 2000 mg/m$^2$, 1800 mg/m$^2$, 1600 mg/m$^2$ or 1500 mg/m$^2$. The thickness of the silver layer can be more than or equal to 65 nm, 70 nm, 80 nm, 90 nm, 100 nm, 110 nm, 120 nm, 130 m or 140 nm; it can be less than 200 nm, 180 nm, 160 nm or 150 nm. These values provide a good compromise between favourable reflection values and acceptable production cost.

The process according to the invention can apply to the manufacture of mirrors with or without a protective copper layer. Mirrors without a copper layer can be advantageous for the environment.

Advantageously, a treatment of the silver layer with a silane can be conducted before the reheating step. This can contribute to the resistance of the mirror to mechanical stresses and/or corrosion.

The paint covering the silver layer is preferably lead-free or substantially lead-free. This can be beneficial to the environment. "Substantially lead-free" indicates that the proportion of lead in the paint is significantly less than the proportion of lead in the paints containing lead currently used in mirror production. The proportion of lead in a substantially lead-free paint as defined here is lower than 500 mg/m$^2$, preferably lower than 400 mg/m$^2$ or further preferred lower than 300 mg/m$^2$. The proportion of lead in a lead-free paint as defined here is lower than 100 mg/m$^2$, preferably lower than 80 mg/m$^2$ or further preferred lower than 60 mg/m$^2$. The paints used can be acrylic, epoxy, alkyd or polyurethane paints. They can be applied, for example, by roller or by curtain coating.

According to some advantageous embodiments of the invention, sensitising, activation and/or passivation steps can contribute to the resistance to ageing and/or corrosion of the mirrors and/or to their durability. The solutions are preferably brought into contact with the vitreous substrate in successive steps of production by spraying with intermediate rinsing and/or washing steps. For example, during mirror production glass sheets can pass through successive stations where the sensitising, activating, silvering or passivating reagents are sprayed on. The activation solution can contain bismuth, chromium, gold, indium, nickel, palladium, platinum, rhodium, ruthenium, titanium, vanadium or zinc, or a mixture of at least two of these elements. Palladium is generally preferred. The passivation solution can contain tin, palladium, vanadium, titanium, iron, indium, copper, aluminium, chromium, lanthanum, nickel, europium, zinc, platinum, ruthenium, rhodium, sodium, zirconium, yttrium or cerium, or a mixture of at least two of these elements. Tin or palladium are generally preferred.

In practice, on a mirror production line, for example, the glass sheets are generally transported along the production line by roller conveyors. They are firstly polished and rinsed before being sensitised, for example, by means of a tin chloride solution sprayed onto the glass. They are then rinsed again. An activation solution is then sprayed onto the glass sheets. This solution can be, for example, an aqueous acid solution of $PdCl_2$. The glass sheets then pass into a rinsing station where demineralised water is sprayed on, and then into the silvering station where a traditional silvering solution is sprayed on, this solution being the result of a combination at the surface of the glass of two solutions sprayed separately, one solution containing a silver salt and either a reducing agent or a base, the other containing either the reducing agent or the base absent from the solution containing the silver salt. The flow rate and concentration of the silvering solution sprayed onto the glass are controlled in order to form a silver layer of the desired thickness. The glass is then rinsed and an aqueous solution of $SnCl_2$, for example, is then directly sprayed onto the glass sheets while they advance along the conveyor. After another rinse, the mirrors can be treated by spraying a solution containing a silane. After a last rinse, the silvered glass sheets enter a conventional drying station at 60° C., then a reheating station, e.g. a hot air convection oven, that is regulated so that the silver layer reaches a temperature of at least 200° C. The mirrors are then covered with one or more paint layers. Each paint layer is cured or dried before any further paint layer is applied, e.g. in a tunnel furnace. The paint is preferably applied to silvered substrates in the form of a continuous curtain of liquid paint dropping onto the glass sheets.

In general, it can prove difficult to dry a thick layer of paint correctly using an external heat source, e.g. in a furnace: a drying skin can sometimes be observed on the surface of the paint that inhibits evaporation of the solvents and inhibits drying in the depth of the paint layer. We have discovered that the present invention can remedy this problem. In fact, since the reheating step occurs before the paint step, the glass and/or silver layer can still be hot during application of the paint layer. This can either enable the temperature or the duration of the curing of the paint to be reduced in the oven with the same thickness of paint, or allow the thickness of the paint to be cured to be increased with the same temperature and the same heating time in the paint curing oven. This can also enable the drying skin effect to be reduced and allow the solvents to evaporate more easily.

The process according to the invention can apply to the production of thin mirrors, e.g. for solar applications that require curved reflectors, for example, with a thickness of more than 0.8 mm, 0.9 mm or 1.1 mm and/or less than 2 mm or 1.5 mm, e.g. a thickness of about 0.95 or 1.25 mm; and also apply to the production of thicker mirrors, e.g. for solar applications with flat reflectors, for example, with a thickness of more than 2 mm or 2.5 mm and/or less than 6 mm or 5 mm.

According to another aspect, the present invention relates to mirrors according to claim 7, the dependent claims disclosing preferred embodiments.

Mirrors according to the invention comprise a glass substrate covered by a silver layer, which is itself covered by at least one paint layer, characterised in that the substrate comprises an upper surface stratum on the side of the silver layer containing silver, and in that this silver-enriched stratum has a thickness of at least 10 nm, preferably at least 20 nm, 30 nm, 40 nm, 50 nm, 60 nm, 70 nm, 80 nm, 90 nm, 100 nm, 110 nm or 120 nm, and more preferred at least 130 nm, 140 nm, 150 nm, 160 nm, 170 nm, 180 nm, 190 nm or 200 nm. The silver-enriched stratum preferably has a thickness of less than 1000 nm, 900 nm, 800 nm or 700 nm.

Such mirrors have the advantage of having a light reflection and/or an energy reflection higher than that of a mirror of identical manufacture that does not contain silver in the surface section of the substrate or only in a less significant thickness. Moreover, this improvement of the reflection properties of the mirror is not to the detriment of other important properties, e.g. the resistance of the mirror to corrosion and/or ageing.

The presence of silver in the upper layer of the substrate (on the paint layer side) can be monitored using XPS or SIMS dynamic profiles after having stripped the paint and dissolved the silver layer from the mirror. The SIMS method is preferred because it is better suited to observing silver present at such depths in the glass substrate.

The mirrors according to the invention can have quantities of silver present in the substrate, measured using SIMS, of at least $0.01$ mg/m$^2$, preferably at least $0.02$ mg/m$^2$, $0.05$ mg/m$^2$ or $0.1$ mg/m$^2$, and these quantities can be less than 2 mg/m$^2$, 1.5 mg/m$^2$ or 1 mg/m$^2$. The intensity ratios of $I(Ag)/I(Si)$, determined by SIMS at the surface of the substrate, can be at least 0.0010, 0.0020 or 0.0030, and these ratios can be less than 0.05 or 0.04.

According to preferred embodiments of the invention, the glass substrate of the mirrors can also comprise an upper surface stratum on the side of the silver layer containing palladium. This palladium-enriched stratum preferably has a thickness of at least 5 nm, 6 nm, 7 nm, 8 nm, 9 nm or 10 nm, and preferably has a thickness of less than 20 nm, 15 nm or 13 nm.

The presence of palladium in the upper layer of the substrate (on the paint layer side) can be monitored by XPS profiles after having stripped the paint and dissolved the silver layer from the mirror.

The mirrors obtained by the present invention can have a light reflection in accordance with ISO standard 9050:2003 (measured through the surface of the glass at an angle of incidence of 8° relative to the normal, using illuminant D65) higher than or equal to 85%, 90%, 91%, 92%, 93%, 94% or 95%. The mirrors obtained by the present invention can have an energy reflection in accordance with ISO standard 9050:2003 (measured through the surface of the glass at an angle of incidence of 8° relative to the normal, using illuminant D65) higher than or equal to 82%, 84%, 85% or 86% on clear glass or higher than or equal to 90%, 92% or 93% on extra-clear glass.

Some particular embodiments of the invention will now be described by way of examples. Comparative examples that do not form part of the invention are also presented. The data relating to these examples and comparative examples are shown in Tables I, II, III and IV.

EXAMPLES 1-42 AND COMPARATIVE EXAMPLES 1-7

Examples 1 to 42 and comparative examples 1-7 relate to mirrors having a "float" glass substrate with a thickness of 4 mm. Examples 1 to 26 and comparative examples 1 to 4 were conducted on a clear glass of a certain composition, examples 27 to 36 and comparative example 5 were conducted on a clear glass of another composition and finally examples 37 to 42 and comparative examples 6 and 7 were conducted on an extra-clear glass. All the examples have a quantity of silver of 1400 mg/m$^2$, and this is also the case in the comparative examples with the exception of comparative example 1 which comprises 850 mg of silver per m$^2$ of glass.

Besides drying of the silver layer at about 60° C., all the mirrors according to the examples underwent reheating of the silver layer according to the parameters given in Table I. The reheating temperatures given therein are those of the atmosphere of the furnace. Comparative examples 1 to 3 and 5 to 7 did not undergo reheating, but a simple drying operation in accordance with the prior art. Comparative example 4 underwent a reheating operation at a temperature lower than those provided by the present invention.

All the mirrors according to these examples and comparative examples underwent a sensitising step using $SnCl_2$ and an activating step with $PdCl_2$ before silvering, and a passivation step with $SnCl_2$ after silvering. The mirrors according to examples 37 to 42 and comparative examples 1 to 4 and 6 and 7 were then covered with a first layer of 25 μm of alkyd-melamine paint dried at 100° C. for about 1 minute, then a second layer of about 30 μm of alkyd-melamine paint dried at 160° C. for about 3 minutes. Examples 38, 40 and 42 and comparative examples 2, 6 and 7 were then covered again with a third layer of about 30 μm of alkyl-melamine paint dried at 160° C. for about 3 minutes.

The light reflection (LR) and energy reflection (ER) values are given in Table I. Reflection values are also given for the painted comparative examples after the paint has been dried. The term "destroyed" in Table I was used when the reheating was too severe and the silver layer damaged.

It can be seen from these values that the drying steps for the paint supplied a certain amount of heat to the silver layer that enabled the reflection values to be increased, as did a reheating process at 130° C. for 10 minutes, but that the reflection values are significantly increased when an additional amount of heat is supplied to the silver layer by a reheating process at a temperature of at least 200° C.

UV rays are known to damage the reflective properties of mirrors after long exposure to the sun, as is the case with solar mirrors. The UV transmission ($T_{uv}$) of mirrors that have not been painted according to examples 1 to 8 and comparative examples 2 or 3 was measured in accordance with ISO standard 9050. The results are given in Table I. A lower UV transmission indicates a mirror that will have better resistance to UV rays over time. These results show that the UV transmission fluctuates according to the reheating parameters applied to the mirrors. Therefore, it can appear advantageous to select reheating parameters in order to optimise the LR and ER values with the $T_{uv}$ value by choosing high LR and ER values and the lowest possible $T_{uv}$.

EXAMPLES 43-48 AND COMPARATIVE EXAMPLE 8

Examples 43 to 48 and comparative example 8 relate to mirrors having a "float" glass substrate, a silver layer containing 800 mg/m² of silver and at least one paint layer.

All the mirrors of these examples underwent reheating of the silver layer according to the parameters given in Table II. The reheating temperatures given therein are those of the atmosphere of the furnace. Comparative example 8 did not undergo reheating, but a simple drying operation in accordance with the prior art. The mirrors were also subjected to a curing step for the paint in a classic manner (curing at 160° C.—3 minutes). All the mirrors according to these examples and the comparative example underwent a sensitising step using $SnCl_2$ and an activating step with $PdCl_2$ before silvering, as well as a passivation step with $SnCl_2$ after silvering.

The mirrors were then stripped using a paint stripper to remove the coats of paint, then the silver layer was dissolved using two different processes in order to obtain a bare substrate. In both cases, the mirrors were soaked in a solution for 5 to 10 seconds: in the first case, this was an aqueous solution of 65% $HNO_3$ and in the second case a solution containing 1/5 of 30% $H_2O_2$, 1/5 of 25% $NH_3$ and 3/5 of demineralised water.

The substrates were analysed using XPS and SIMS and the results obtained are given in Table II. The SIMS analysis demonstrates the presence of silver on the surface of the substrate to a depth of between 142 and 644 nm according to the examples. The XPS analysis is a good method of determining immediately whether there is any silver in the substrate, but is not sufficiently sensitive to measure the total thickness of the silver-enriched surface stratum. In contrast, the XPS analysis is a good method of determining the depth to which palladium is present in the substrate.

EXAMPLES 49-54

Examples 49 to 54 relate to silvered glasses comprising a "float" glass substrate and a silver layer containing 800 mg/m² of silver. All these examples underwent a reheating of the silver layer according to the invention. Measurements of the LR were conducted before reheating and others were conducted afterwards. The increases in LR observed after reheating are given in Table III. These results show that it is possible to arrive at comparable increases in LR using different reheating "schemes" (time-temperature combination).

EXAMPLES 55-57 AND COMPARATIVE EXAMPLE 9

Examples 55 to 57 and comparative example 9 relate to extra-clear "float" glasses with a thickness of 4 mm that have been silvered to form a silver layer containing 1400 mg/m². All these examples and the comparative example underwent a sensitising step using $SnCl_2$ and an activating step with $PdCl_2$ before silvering, as well as a passivation step with $SnCl_2$ after silvering. Examples 55 to 57 underwent reheating of the silver layer according to the invention using an induction heating method. The reheating parameters as well as the light reflection measurements are given in Table IV. The reheating temperatures given therein are those reached by the silver layer (measured by infrared camera). Comparative example 9 did not undergo reheating, but a simple drying process in accordance with the prior art.

TABLE I

| | 4 mm float glass substrate | Silvering | (Drying) Curing | before painting | | | | after painting | |
|---|---|---|---|---|---|---|---|---|---|
| | | | | LR [%] | ER [%] | $T_{uv}$ [%] | Paint Application | LR [%] | ER [%] |
| Comp. Ex 1 | clear compos. I | 850 mg/m² | (60° C. - 1 min) | 90.01 | | | 2 alkyd-melamine layers | 91.21 | |
| Comp. Ex 2 | clear compos. I | 1400 mg/m² | (60° C. - 1 min) | 91.41 | 84.01 | 51.9 | 3 alkyd-melamine layers | 92.53 | 84.90 |

TABLE I-continued

| | 4 mm float glass substrate | Silvering | (Drying) Curing | before painting | | | Paint Application | after painting | |
|---|---|---|---|---|---|---|---|---|---|
| | | | | LR [%] | ER [%] | $T_{uv}$ [%] | | LR [%] | ER [%] |
| Comp. Ex 3 | clear compos. I | 1400 mg/m² | (60° C. - 1 min) | 91.41 | 84.01 | 51.9 | 2 alkyd-melamine layers | 91.99 | 84.40 |
| Comp. Ex 4 | clear compos. I | 1400 mg/m² | 130° C. - 10 min) | 91.90 | 84.44 | | 2 alkyd-melamine layers | 92.16 | 84.66 |
| Ex. 1 | clear compos. I | 1400 mg/m² | 200° C. - 10 min) | 92.70 | 85.02 | 49.1 | | | |
| Ex. 2 | clear compos. I | 1400 mg/m² | 200° C. - 20 min) | 92.85 | 85.14 | 50.2 | | | |
| Ex. 3 | clear compos. I | 1400 mg/m² | 250° C. - 10 min) | 92.88 | 85.26 | 51.1 | | | |
| Ex. 4 | clear compos. I | 1400 mg/m² | 250° C. - 20 min) | 93.50 | 85.62 | 50.2 | | | |
| Ex. 5 | clear compos. I | 1400 mg/m² | 300° C. - 10 min) | 93.07 | 85.36 | 54 | | | |
| Ex. 6 | clear compos. I | 1400 mg/m² | 300° C. - 20 min) | 92.80 | 85.10 | 52.5 | | | |
| Ex. 7 | clear compos. I | 1400 mg/m² | 350° C. - 10 min) | 92.63 | 84.97 | 56.1 | | | |
| Ex. 8 | clear compos. I | 1400 mg/m² | 350° C. - 20 min) | 93.11 | 85.33 | 52.3 | | | |
| Ex. 9 | clear compos. I | 1400 mg/m² | 400° C. - 3 min) | 91.56 | 84.18 | | | | |
| Ex. 10 | clear compos. I | 1400 mg/m² | 400° C. - 5 min) | 92.28 | 84.81 | | | | |
| Ex. 11 | clear compos. I | 1400 mg/m² | 400° C. - 10 min) | 93.13 | 85.35 | | | | |
| Ex. 12 | clear compos. I | 1400 mg/m² | 450° C. - 3 min) | 92.61 | 84.95 | | | | |
| Ex. 13 | clear compos. I | 1400 mg/m² | 450° C. - 5 min) | 92.97 | 85.30 | | | | |
| Ex. 14 | clear compos. I | 1400 mg/m² | 450° C. - 10 min) | destroyed | | | | | |
| Ex. 15 | clear compos. I | 1400 mg/m² | 500° C. - 3 min ) | 92.07 | 84.61 | | | | |
| Ex. 16 | clear compos. I | 1400 mg/m² | 500° C. - 5 min) | 92.83 | 85.21 | | | | |
| Ex. 17 | clear compos. I | 1400 mg/m² | 500° C. - 10 min) | destroyed | | | | | |
| Ex. 18 | clear compos. I | 1400 mg/m² | 550° C. - 3 min) | 92.76 | 85.09 | | | | |
| Ex. 19 | clear compos. I | 1400 mg/m² | 550° C. - 5 min) | 93.31 | 85.40 | | | | |
| Ex. 20 | clear compos. I | 1400 mg/m² | 550° C. - 10 min) | destroyed | | | | | |
| Ex. 21 | clear compos. I | 1400 mg/m² | 600° C. - 3 min) | 92.49 | 84.90 | | | | |
| Ex. 22 | clear compos. I | 1400 mg/m² | 600° C. - 5 min) | destroyed | | | | | |
| Ex. 23 | clear compos. I | 1400 mg/m² | 600° C. - 10 min) | destroyed | | | | | |
| Ex. 24 | clear compos. I | 1400 mg/m² | 650° C. - 3 min) | destroyed | | | | | |
| Ex. 25 | clear compos. I | 1400 mg/m² | 650° C. - 5 min) | destroyed | | | | | |
| Ex. 26 | clear compos. I | 1400 mg/m² | 650° C. - 10 min) | destroyed | | | | | |
| Comp. Ex 5 | clear compos. II | 1400 mg/m² | (60° C. - 1 min) | 91.86 | 85.53 | | | | |
| Ex. 27 | clear compos. II | 1440 mg/m² | 400° C. - 3 min | 91.99 | 85.44 | | | | |
| Ex. 28 | clear compos. II | 1440 mg/m² | 400° C. - 5 min | 92.64 | 85.93 | | | | |
| Ex. 29 | clear compos. II | 1440 mg/m² | 400° C. - 10 min | 93.11 | 86.32 | | | | |
| Ex. 30 | clear compos. II | 1440 mg/m² | 500° C. - 3 min | 93.03 | 86.32 | | | | |
| Ex. 31 | clear compos. II | 1440 mg/m² | 500° C. - 5 min | 93.18 | 86.37 | | | | |
| Ex. 32 | clear compos. II | 1440 mg/m² | 550° C. - 3 min | 92.97 | 86.24 | | | | |
| Ex. 33 | clear compos. II | 1440 mg/m² | 550° C. - 5 min | 92.75 | 86.02 | | | | |
| Ex. 34 | clear compos. II | 1440 mg/m² | 550° C. - 10 min | destroyed | | | | | |

TABLE I-continued

| | 4 mm float glass substrate | Silvering | (Drying) Curing | before painting LR [%] | ER [%] | $T_{uv}$ [%] | Paint Application | after painting LR [%] | ER [%] |
|---|---|---|---|---|---|---|---|---|---|
| Ex. 35 | clear compos. II | 1440 mg/m² | 570° C. - 3 min | destroyed | | | | | |
| Ex. 36 | clear compos. II | 1440 mg/m² | 570° C. - 5 min | destroyed | | | | | |
| Comp. Ex 6 | extra clear | 1400 mg/m² | (60° C. - 1 min) | 93.64 | 92.28 | | 2 alkyd-melamine layers | 94.37 | 92.84 |
| Comp. Ex 7 | extra clear | 1400 mg/m² | (60° C. - 1 min) | 93.64 | 92.28 | | 3 alkyd-melamine layers | 94.69 | 93.13 |
| Ex. 37 | extra clear | 1400 mg/m² | 250° C. - 20 min | 94.90 | 93.33 | | 2 alkyd-melamine layers | 94.72 | 93.18 |
| Ex. 38 | extra clear | 1400 mg/m² | 400° C. - 10 min | 95.62 | 93.85 | | 3 alkyd-melamine layers | 95.40 | 93.71 |
| Ex. 39 | extra clear | 1400 mg/m² | 450° C. - 5 min | 94.77 | 93.19 | | 2 alkyd-melamine layers | 94.93 | 93.34 |
| Ex. 40 | extra clear | 1400 mg/m² | 450° C. - 5 min | 94.77 | 93.19 | | 3 alkyd-melamine layers | 94.92 | 93.25 |
| Ex. 41 | extra clear | 1400 mg/m² | 550° C. - 3 min | 94.73 | 93.16 | | 2 alkyd-melamine layers | 94.61 | 93.05 |
| Ex. 42 | extra clear | 1400 mg/m² | 550° C. - 3 min | 94.73 | 93.16 | | 3 alkyd-melamine layers | 94.90 | 93.30 |

TABLE II

| | (Drying) Reheating | Paint Application(s) | Dissolution of Silver Layer | SIM Results | | | XPS Results | |
|---|---|---|---|---|---|---|---|---|
| | | | | Thickness of Ag-enriched stratum [nm] | I(Ag)/I(Si) | Quantity of Ag in Ag-enriched stratum [mg/m²] | Thickness of Pd-enriched stratum [nm] | Thickness of Ag-enriched stratum [nm] |
| Comp. Ex 8 | (60° C. - 1 min) | curing at 160° C. - 3 min | HNO₃ | — | — | — | 0 | 0 |
| Ex. 43 | 250° C. - 18 min | curing at 160° C. - 3 min | HNO₃ | 142 | 0.0014 | 0.02 | 7.0 | presence of Ag |
| Ex. 44 | 250° C. - 18 min | curing at 160° C. - 3 min | H₂O₂/NH₃ | 170 | 0.0032 | 0.07 | 8.7 | presence of Ag |
| Ex. 45 | 400° C. - 6 min | curing at 160° C. - 3 min | HNO₃ | 365 | 0.0030 | 0.3 | 7.0 | presence of Ag |
| Ex. 46 | 400° C. - 6 min | curing at 160° C. - 3 min | H₂O₂/NH₃ | 400 | 0.0016 | 0.3 | 7.8 | presence of Ag |
| Ex. 47 | 550° C. - 2.5 min | curing at 160° C. - 3 min | HNO₃ | 644 | 0.0050 | 0.8 | 7.0 | presence of Ag |
| Ex. 48 | 550° C. - 2.5 min | curing at 160° C. - 3 min | H₂O₂/NH₃ | 500 | 0.0340 | 0.4 | 7.0 | presence of Ag |

TABLE III

| | Duration of Reheating | Max. T° reached by sample [° C.] | LR Increase [%] |
|---|---|---|---|
| Ex. 49 | 1'13" | 238.5 | 0.50 |
| Ex. 50 | 2'08" | 243 | 0.52 |
| Ex. 51 | 2'19" | 330 | 0.57 |
| Ex. 52 | 1'19" | 242.5 | 1.31 |
| Ex. 53 | 2'07" | 364.5 | 1.29 |
| Ex. 54 | 3'22" | 429.5 | 1.30 |

TABLE IV

| | (Drying) Reheating | Duration of Reheating | Frequency [kHz] | LR [%] |
|---|---|---|---|---|
| Comp. Ex 9 | (60° C. - 1 min) | — | — | 94.12 |
| Ex. 55 | 450 | 1'50" | 900 | 94.86 |
| Ex. 56 | 500 | 2' | 900 | 95.12 |
| Ex. 57 | 550 | 2'20" | 900 | 95.36 |

The invention claimed is:

1. A mirror, comprising:
   a glass substrate;
   a modified silver layer, which is in contact with and covers said glass substrate; and
   a paint layer, which is in contact with and covers said modified silver layer, wherein
   a silver-enriched stratum is present within said glass substrate in an area that is in contact with and covered by said modified silver layer, and
   said silver-enriched stratum has a thickness of at least 10 nm.

2. A process of forming a mirror according to claim 1, comprising:
   contacting the substrate with a silvering solution to form a silver layer on said substrate;
   drying the silver layer obtained from said contacting;
   heating the silver layer to a temperature of at least 200° C., thereby forming a modified silver layer on said substrate and a silver-enriched stratum at an upper side of said substrate that is in contact with and covered by said modified silver layer;
   painting said modified silver layer with a paint; and
   drying said paint to form a painted layer in contact with and covering said modified silver layer,
   wherein said heating the silver layer is carried out after said drying the silver layer and before said painting said modified silver layer.

3. The process according to claim 2, wherein
   said heating the silver layer is carried out by at least one method selected from the group comprising heating by infrared radiation, convection heating, metal induction and microwave heating.

4. The process according to claim 3, wherein
said heating the silver layer is carried out in an atmosphere comprising an inert gas.

5. The process according to claim 3, wherein said heating is carried out in an atmosphere consisting essentially of an inert gas.

6. The process according to claim 2, wherein the mirror has no copper layer.

7. The process according to claim 2, further comprising:
contacting said substrate with a solution comprising at least one element selected from the group consisting of bismuth, chromium, gold, indium, nickel, palladium, platinum, rhodium, ruthenium, titanium, vanadium and zinc, thereby activating said substrate,
wherein the activating of said substrate is carried out prior to said contacting the substrate with a silvering solution.

8. The process according to claim 2, further comprising:
contacting said modified silver layer with a solution comprising at least one element selected from the group consisting of tin, palladium, vanadium, titanium, iron, indium, copper, aluminium, chromium, lanthanum, nickel, europium, zinc, platinum, ruthenium, rhodium, sodium, zirconium, yttrium and cerium, thereby passivating the modified silver layer.

9. The process according to claim 2, wherein the substrate is heated to a temperature of at least to a temperature of at least 225° C. during said heating.

10. The process according to claim 2, wherein the substrate is heated to a temperature of at least to a temperature of at least 250° C. during said heating.

11. The process according to claim 2, wherein the substrate is heated to a temperature of at least to a temperature of at least 275° C. during said heating.

12. The process according to claim 2, wherein the substrate is heated to a temperature of at least to a temperature of at least 300° C. during said heating.

13. The process according to claim 2, wherein the substrate is heated to a temperature of at least to a temperature of at least 325° C. during said heating.

14. The process according to claim 2, wherein the substrate is heated to a temperature of at least to a temperature of at least 350° C. during said heating.

15. The process according to claim 2, wherein the substrate is heated to a temperature of at least to a temperature of at least 375° C. during said heating.

16. The process according to claim 2, wherein the substrate is heated to a temperature of at least to a temperature of at least 400° C. during said heating.

17. The process according to claim 2, wherein heating the silver layer to a temperature of at least 200° C. is carried out for a period of from 1 to 20 minutes.

18. The process according to claim 2, wherein the substrate is heated to a temperature of from 200° C. to 700° C.

19. The mirror according to claim 1, wherein the silver-enriched stratum has a thickness of at least 20 nm.

20. The mirror according to claim 1, wherein the silver-enriched stratum has a thickness of at least 50 nm.

21. The mirror according to claim 1, wherein the substrate further comprises an upper surface stratum on the side of the silver layer comprising palladium, and in that this palladium-enriched stratum has a thickness of at least 5 nm.

22. The mirror according to claim 21, wherein the palladium-enriched stratum has a thickness of at least 7 nm.

23. The mirror according to claim 1, wherein the substrate is an extra-clear glass.

24. The mirror according to claim 1, wherein the modified silver layer has a thickness in the range of between 70 and 150 nm.

25. The mirror according to claim 1, wherein said mirror comprises tin on the surface of the substrate on the side of the silver layer.

26. The mirror according to claim 1, wherein said mirror has no copper layer.

27. The mirror according to claim 1, wherein the silver-enriched stratum has a thickness of from 10 nm to 1000 nm.

* * * * *